United States Patent Office 2,925,165
Patented Feb. 16, 1960

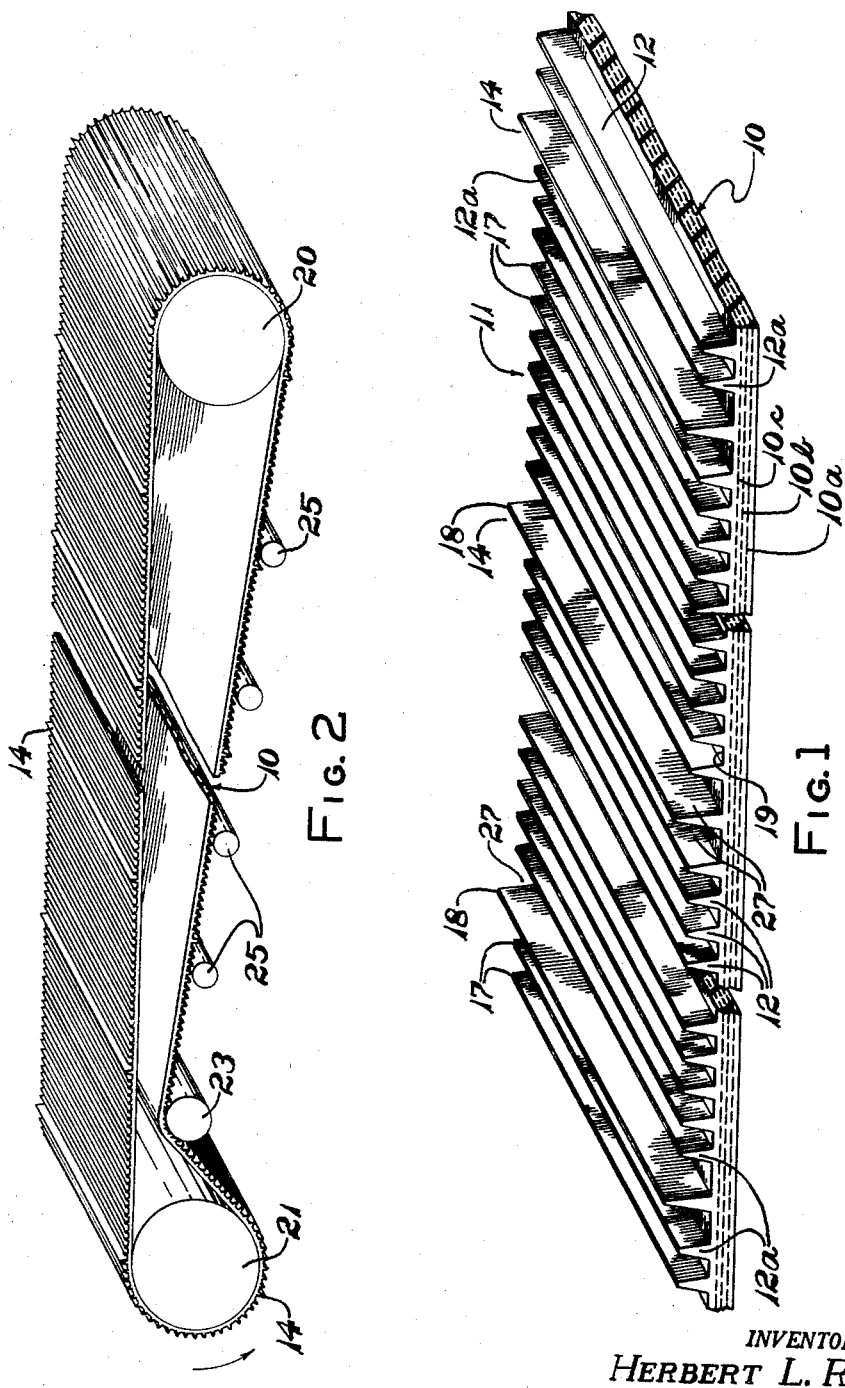

2,925,165

BELT

Herbert L. Rake, Cuyahoga Falls, Ohio, assignor to The B. F. Goodrich Company, New York, N.Y., a corporation of New York Application January 30, 1958, Serial No. 712,168

3 Claims. (Cl. 198—198)

This invention relates to conveyors and more particularly to conveyor systems embodying belts having a skid-resistant load-carrying surface especially suitable for carrying light packages on inclined courses.

A package conveyor in accordance with this invention includes a belt having on its load-carrying surface a series of transverse cleats widely spaced from each other lengthwise of the belt. The regions between the cleats on the load-carrying surface are rendered skid-resistant preferably by a multitude of closely spaced transverse ribs appreciably shorter than the cleats. Both the cleats and the ribs are of soft, flexible, resilient rubber.

A unique characteristic of the belt of this invention is that notwithstanding its cleated load-carrying surface, the belt is adapted for operating wits its cleated load-carrying surface directly engaging conventional cylindrical return idlers and snubbing or driving pulleys. It has been found that the cleated load-carrying surface of this belt is capable of riding smoothly over cylindrical surfaced pulleys and idlers without causing objectionable vibration in the conveyor or impairing or otherwise damaging the skid-resistant surface of the belt. It is therefore practical to use the cleated belt of this invention in very long conveyors which necessarily include such idlers to support the return run of the belt. This belt also makes feasible the use of snubbing or reverse-bend drive pulleys which are most advantageous because with such pulleys a belt can be operated under much lower tension than the tension needed for belts trained directly between a head and tail pulley. Heretofore, with the cleated belts known prior to this invention, the length of the individual conveyor flights was quite limited, and the benefits of using snubbing and driving pulleys against the load-carrying side could not be realized.

The preferred configuration of ribs and cleats forming the load-carrying surface of the belt of this invention provides an unusually effective traction surface particularly suitable for carrying light smooth articles such as paper-wrapped or cardboard packages weighing less than a pound. Small very light articles are normally carried by this belt on the crests of the ribs. Should an article start to slip on the belt, its movement is promptly checked as soon as the article engages one of the cleats.

Because of the flexibility of both the cleats and the ribs, they tend to fold toward the carcass when a heavy article is placed on the belt. If an article becomes caught or jammed in the conveyor frame, the ribs and cleats are adapted to fold down and pass under the stalled article without materially damaging the article. The same folding effect occurs as the load-carrying surface moves over or around a snubbing or reverse-bend drive pulley depending on the tension in the belt. In their folded positions, wear on the ribs and cleats occurs primarily along the upstanding sides of the ribs and cleats, rather than at their crests. Thus the skid resistant character of the load-carrying surface is preserved substantially uniform for the life of the belt.

The cleats serve the additional function of facilitating the transfer of light articles onto and off the belt.

Depending on the weight, shape and nature of the surface of the articles to be transported, the belts may be installed to carry articles along courses inclined as much as 45°.

The invention will be further described with reference to the accompanying drawings. In the drawings:

Fig. 1 shows a partial perspective view of one form of a belt having a load-carrying surface embodying cleats and ribs in accordance with this invention, the view showing a cross-sectional profile of the belt along a plane parallel to the longitudinal axis of the belt (the lengthwise dimension of the belt in Fig. 1 is indicated by the arrow next to the view); and Fig. 2 is a semi-schematic perspective view showing how the belt of Fig. 1 may be trained in a conveyor apparatus which includes a snubbing pulley and return idlers engaged with the load-carrying surface.

The particular belt shown in Fig. 1 includes a thin flexible carcass 10 formed of three plies, 10a, 10b and 10c of a rubber-impregnated woven belt duck fabric. The cloth reinforcement of the carcass may vary according to the service for which the belt is intended and may be selected and constructed according to conventional flat belt making techniques.

The upper or load-carrying surface 11 of the belt is of rubber material vulcanized to the carcass. This surface is molded in the form of a multiplicity of closed-spaced parallel soft flexible resilient ribs 12, all of substantially equal height and disposed perpendicularly to the longitudinal axis of the belt. The surface 11 also includes a series of transverse cleats 14 which, like the ribs, are of soft, flexible and resilient rubber and which are disposed parallel to the ribs. The cleats 14 are widely spaced apart lengthwise of the belt so that there are very many ribs between successive cleats. The opposing upstanding sides of both the ribs and cleats taper upward from the carcass to thin upper flattened edges or crests 17 and 18, respectively.

For the purpose of illustrating preferred proportions, in the belt shown in Fig. 1 the ribs 12 are preferably spaced so that their crests 17 are about ¼ inch apart and the cleats preferably spaced so that their crests 18 are about eighteen inches apart; between successive cleats there are seventy ribs 12.

Each of the ribs and the cleats has the general cross-sectional shape of an inverted V, or more precisely an isosceles triangle. The base width of each cleat where it is joined to the carcass is about equal to the base width of the ribs. The ribs are preferably proportioned so that their heights is about twice the width of their base. The height of the cleats 14 is about three times the width of their base; thus the cleats are fifty percent higher than the ribs. Preferably the gap between the bases of adjacent ribs is about equal to the base width of the ribs. The ribs 12a, however, which flank each cleat 14 are spaced from their respective cleats a slightly greater distance than the base width of the cleat. This additional spacing between ribs 12a and the cleats provides a channel 27 along each side of the cleat which permits the cleats to be folded downwardly toward the carcass into a position such that the crests 18 of the cleats is at about the same elevation above the carcass as the crests of the adjoining ribs. Thus the cleats may be folded toward the carcass without providing an appreciable bump or irregularity in the contour of the load-carrying surface. This is one of the features of the design which makes it practical to pass the load-carrying surface of this belt about a snubbing pulley and over other cylindrical pulleys without producing undue vibration in the conveyor or excessive wear on the load-carrying surface.

Because of the triangular cross-sectional shape of the ribs and cleats, these elements are highly flexible locally near their crests and are progressively stiffer toward their base. Consequently, very light packages or very heavy packages can be carried effectively on the same belt. The ribs are adapted to distort locally to conform to the shape of the package or the article deposited on the belt. Heavier articles naturally will distort the ribs appreciably more than lighter articles.

Both the ribs 12 and the cleats 14 are formed of soft flexible resilient but durable rubber compounds. Rubber compounds having a 45 to 60 Shore A durometer hardness are preferred for the load-carrying surface.

Between successive ribs and/or the ribs and cleats the upper surface of the carcass 10 is covered with a thin protective skin 19 of the rubber cover compound.

The term "rubber" as used herein includes both natural rubber materials and synthetic rubber-like materials which have or can be compounded to provide the extensibility and elasticity characteristic of natural rubber. The term includes materials such as polyvinyl chloride, polyethylene, etc., when properly compounded for this purpose.

As previously mentioned, the cleats 14 not only cooperate with the ribs to support packages but the cleats are also adapted to engage and arrest sliding motion of an article which may start to slide on the ribs. Another useful function of the cleats 14 is for transferring light articles on and off the belt. Thus as the load-carrying surface of the belt moves upwardly around a tail pulley 20 (Fig. 2) at the loading end of a conveyor embodying this belt, the cleats 14 will successively engage light packages at the loading zone and push them onto the ribbed areas between the cleats. Similarly, at the discharge end (for example, near head pulley 21, Fig. 2) the cleats operate to push an article directly onto a suitable receiving apron (not shown) in the plane of the load-carrying surface ahead of the head pulley 21 to thereby avoid congestion at the discharge platform. Although the cleats are very soft and flexible near their crests, the medial portion of the cleats at about the elevation of the crest of the ribs is sufficiently stiff to push light packages on or off the belt.

In Fig. 2 a belt like that of Fig. 1 is shown trained endlessly around a head pulley 21 and a tail pulley 20.

To increase the length of the belt wrapped about the surface of the head pulley 21, which is the drive pulley in the system illustrated, a snubbing pulley 23 is located adjacent the pulley 21 so that it engages the load-carrying surface 11 in the return reach of the belt. The snubbing pulley 23 thus cooperates with the head pulley 21 in driving the belt. Also the view shows several return reach idlers 25.

As the belt moves progressively around the snubbing pulley 23, its cleats 14 are folded over toward the carcass so that their crests 18 are at about the elevation of the rib crests 17. Depending on the amount of tension in the belt, the ribs 12 may also be folded somewhat toward the carcass, but in any event as the belt moves about pulley 23 the crests of the ribs and cleats are at substantially the same elevation so that the belt will move fairly smoothly around the snubbing pulley 23 without imparting bumping or vibrating motions to the conveyor belt.

The folding or nesting action of the ribs and cleats is essentially the same as the belt passes over idler rolls 25 in the return reach, or if the snubbing pulley 23 itself were powered to drive the belt. In the latter event the belt would preferably have a greater length of it wrapped about pulley 23 than as shown in Fig. 2.

Variations in the construction disclosed may be made within the scope of the appended claims.

I claim:

1. A conveyor belt having a flexible carcass and a load-carrying side thereon comprising a multitude of closely spaced soft flexible resilient rubber ribs of substantially equal height extending transversely to the load-carrying side, and a plurality of soft flexible resilient rubber cleats extending transversely to the load-carrying side, successive cleats being spaced apart longitudinally of the belt by a multitude of said ribs, all said cleats being of appreciably greater height in their normal upright position than said ribs, and said ribs and cleats being spaced relative to each other so that the ribs and cleats may be folded toward the carcass to a position in which the crests of the ribs and the crests of the cleats are at substantially the same elevation above the carcass.

2. A conveyor belt having a flexible carcass and a load-carrying side thereon comprising many closely spaced soft flexible resilient parallel rubber ribs extending transversely to the load-carrying side, said ribs being of inverted V cross-sectional shape, and all said ribs being of substantially equal height which height is equal to about twice the width of the base of said ribs, and a plurality of soft flexible resilient rubber cleats extending transversely to the load-carrying side parallel to said ribs, said cleats also being of inverted V cross-sectional shape and having a height of about three times the width of the base thereof, the width of the base of the ribs being equal to the width of the base of the cleats, successive cleats being spaced apart lengthwise of the belt by a multitude of said ribs, and said ribs and said cleats being of a rubber compound having a Shore A durometer of between about 45 and 60, and the ribs flanking each cleat being spaced from the cleat so that the cleat is adapted for folding toward the carcass to a position in which the crests of the cleats is at substantially the same elevation as the crests of the ribs relative to the carcass.

3. Conveyor apparatus comprising spaced head and tail pulleys, a conveyor belt trained about said pulleys to provide a load-carrying reach and a return reach, said belt having a flexible carcass and a load-carrying side thereon comprising a multiplicity of closely spaced soft flexible resilient parallel rubber ribs extending transversely to the load-carrying side, said ribs having opposing sides tapering upward toward each other from the carcass to a thin crest and all ribs being of substantially equal height, and a plurality of soft flexible resilient rubber cleats extending transversely to the load-carrying side parallel to said ribs, successive cleats being spaced apart longitudinally of the belt by a multitude of said ribs, and all said cleats projecting an appreciable distance above the crest of said ribs in the normal upright position of said ribs and said cleats, and a cylindrical pulley intermediate said head and tail pulley and engaged with said ribbed load-carrying side in the return reach thereof.

References Cited in the file of this patent
UNITED STATES PATENTS

| 1,484,248 | Austin | Feb. 19, 1924 |
| 2,776,528 | Niederer et al. | Jan. 8, 1957 |
| 2,784,835 | Dixon | Mar. 12, 1957 |